(12) United States Patent
Grauer

(10) Patent No.: US 6,394,039 B1
(45) Date of Patent: May 28, 2002

(54) DEVICE FOR RESTRAINING A CAT

(76) Inventor: Shanon O. Grauer, 55 Prince Arthur Avenue, Suite 803, Toronto, Ontario (CA), M5R 1B3

( * ) Notice: Subject to any disclaimer, the term of this patent is extended or adjusted under 35 U.S.C. 154(b) by 0 days.

(21) Appl. No.: 09/433,583

(22) Filed: Nov. 4, 1999

(51) Int. Cl.[7] .............................................. A01K 15/04
(52) U.S. Cl. ....................... 119/712; 119/497; 119/678
(58) Field of Search ................................. 119/496, 497, 119/671, 678, 712, 751, 850

(56) References Cited

U.S. PATENT DOCUMENTS

| | | | | |
|---|---|---|---|---|
| 3,150,640 A | * | 9/1964 | Nevitt ......................... | 119/712 |
| 3,547,079 A | * | 12/1970 | Bassett ....................... | 119/497 |
| 3,941,092 A | | 3/1976 | Winters ....................... | 119/19 |
| 4,137,870 A | | 2/1979 | Cano ........................... | 119/96 |
| 4,541,364 A | | 9/1985 | Contello ..................... | 119/109 |
| 4,644,902 A | | 2/1987 | Doyle .......................... | 119/19 |
| D289,806 S | | 5/1987 | Hadaway ..................... | D30/1 |
| D290,176 S | | 6/1987 | Demeuse ..................... | D30/1 |
| D290,178 S | | 6/1987 | Nissen ......................... | D30/1 |
| D294,748 S | | 3/1988 | Dobelle ..................... | D30/109 |
| 4,796,567 A | * | 1/1989 | Allan et al. ................ | 119/678 |
| D302,610 S | | 8/1989 | Slawinski ................... | D30/109 |
| D310,586 S | | 9/1990 | Dobelle ..................... | D30/109 |
| D311,610 S | | 10/1990 | Dobelle ..................... | D30/109 |
| 4,977,857 A | | 12/1990 | Slawinski ................... | 119/19 |
| 5,009,196 A | | 4/1991 | Young ......................... | 119/101 |
| 5,109,801 A | | 5/1992 | Gahagan | |
| 5,170,745 A | | 12/1992 | Burdette, Jr. ............... | 119/19 |
| D332,865 S | | 2/1993 | Wilmink ...................... | D3/31 |
| 5,277,148 A | | 1/1994 | Rossignol et al. ........... | 119/19 |
| 5,282,439 A | | 2/1994 | Oaks ........................... | 119/19 |
| 5,309,866 A | * | 5/1994 | Santoro ................... | 119/678 X |
| 5,351,646 A | | 10/1994 | Zoroufy | |
| 5,373,814 A | | 12/1994 | Seymour ..................... | 119/795 |
| D360,492 S | | 7/1995 | Horn .......................... | D30/109 |
| D370,090 S | | 5/1996 | Coggins ..................... | D30/109 |
| 5,570,658 A | | 11/1996 | Hillery et al. .............. | 119/751 |
| 5,603,573 A | | 2/1997 | Mercier et al. ............. | 383/117 |
| 5,738,043 A | | 4/1998 | Manuel ....................... | 119/497 |
| 5,738,045 A | | 4/1998 | Bleacher ..................... | 119/751 |
| 5,762,027 A | | 6/1998 | Freund ........................ | 119/672 |
| D398,082 S | | 9/1998 | Martz ......................... | D30/109 |
| D398,083 S | | 9/1998 | Martz ......................... | D30/109 |
| 5,829,392 A | | 11/1998 | Coleman ..................... | 119/795 |

FOREIGN PATENT DOCUMENTS

DE            2324959        11/1998

* cited by examiner

*Primary Examiner*—Robert P. Swiatek
(74) *Attorney, Agent, or Firm*—Katten Muchin Zavis

(57) ABSTRACT

A device for restraining a cat, comprising an enclosure capable of receiving the cat in an upright sitting position, the enclosure having a first opening to receive the cat's tail, and a second opening to receive the cat's neck wherein, but for the cat's head and tail, the cat is confined to the enclosure while in the upright sitting position.

23 Claims, 5 Drawing Sheets

DEVICE FOR RESTRAINING A CAT

BACKGROUND OF THE INVENTION

1. Field of the Invention

The present invention relates to methods of restraining a cat.

2. Description of the Related Art

There comes a time in the life of most household pets when they must be given medication. The medication might be a pill, a shot, or a liquid dispensed into the pet's mouth. A dog tends to receive medications such as this without serious =complaint and often without being aware of the medication being hidden in its food. On the other hand, a cat is, by its very nature, finicky and presents to its owner, a constant challenge to ensure that her cat has received its proper dosage of medication.

It is therefore an object of the present invention to provide an improved technique for restraining a cat.

SUMMARY OF THE INVENTION

According to one of its aspects, the present invention provides a device for restraining a cat, comprising an enclosure capable of receiving the cat in an upright sitting position, the enclosure having a first opening to receive the cat's tail, and a second opening to receive the cat's neck wherein, but for the cat's head and tail, the cat is confined to the enclosure while in said upright sitting position.

In another of its aspects, the present invention provides a device for restraining a cat, comprising an enclosure capable of receiving the cat in an upright sitting position, the enclosure having a first opening to receive the cat's tail, and a second opening to receive the cat's neck and means to reduce, at least partially, the size of the second opening whereby, but for the cat's head and tail, the cat is confined to the enclosure in the upright sitting position.

Preferably, the enclosure is capable of assuming a generally tapered shape on the cat in its upright sitting position. If desired, the enclosure may be made from a fabric such as cotton or polyester and should be resistant to the cat's attempts to scratch or puncture the wall of the enclosure, potentially causing injury to either the cat or its owner. The means to reduce the size of the second opening preferably includes an elastic strap but may alternatively include a clamp, a snap, a draw string, a clip or a hook-and-loop fastener, for example.

In another of its aspects, the present invention provides a method of restraining a cat, comprising placing the cat in an enclosure having a first passage for the cat's tail and a second passage for the cat's neck and configuring the cat and the enclosure so that, but for the cat's head and tail, the cat is confined to the enclosure in an upright sitting position.

In still another of its aspects, the present invention provides a method of restraining a cat, comprising:

placing the cat in an enclosure, of a type capable of allowing the cat to be in an upright sitting position;

placing the cat's tail through a first opening in the enclosure;

placing the cat's neck through a second opening in the enclosure; and configuring the enclosure so that, but for the cat's head and tail, the cat is confined to the enclosure in the upright sitting position.

Thus, the device and method allow the cat to be confined in an upright sitting position. The device and method may, in some cases, allow the cat also to be confined in other positions, possibly such as a cat's normal sitting position where the front paws are in an inclined substantially non-weight bearing position.

BRIEF DESCRIPTION OF THE DRAWINGS

Preferred embodiments of the present invention will be provided, by way of example only, with reference to the appended drawings, wherein.

DESCRIPTION OF THE PREFERRED EMBODIMENTS

Figure 1:
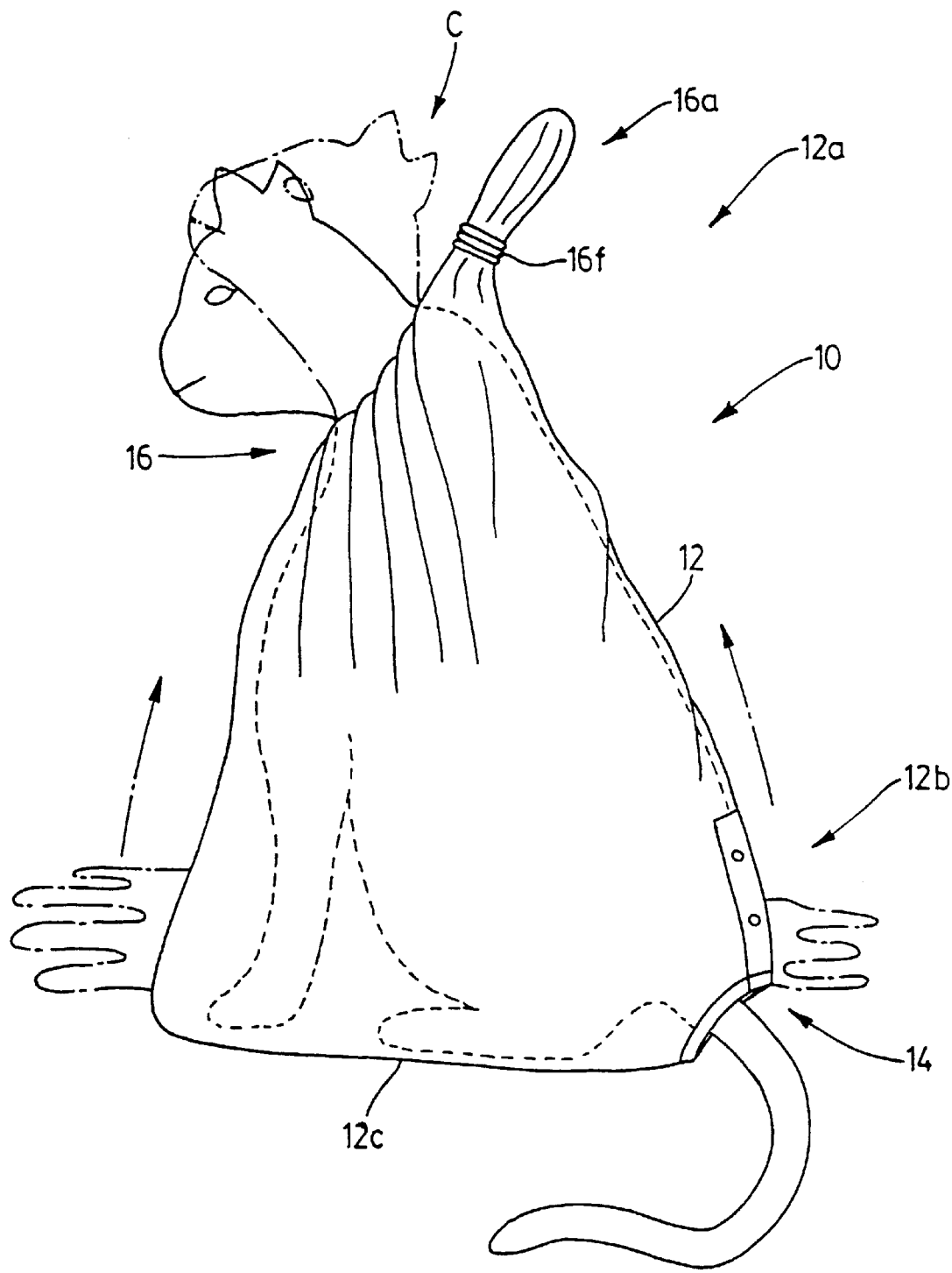
FIG. 1 is a side view of a cat restraining device in an operative condition.

The term "upright sitting position" is intended to refer to the position of a cat when sitting on its hind quarters as shown in FIG. 1.

Referring to the figures, particularly FIG. 1, there is provided a device for restraining a cat shown at 'C' in an "upright sitting position". The device 10 has a bag-like enclosure 12 having an upper region 12a and a lower region 12b, the latter having a first opening formed therein as shown at 14 to receive the cat's tail as will be described. The enclosure has a portion 12c which receives the cat's hind quarters and a second opening 16 in the upper region and generally opposite the first opening. In this case, the second opening is sufficiently large to receive the cat's body through it. Restriction means (in the form of an elastic strap sewn into the enclosure wall as shown in dashed lines at 16c in FIG. 2) is provided at the second upper opening to restrict, at least partially, its size. A pair of snaps 14a is also provided at the first opening to reduce its size. If desired, the snaps or the elastic straps may be replaced or supplemented by a variety of items to provide similar at least partial restriction of the first and second openings respectively, such as a clamp, a snap, a draw string, a clip or a hook-and-loop fastener and the like, for example.

The enclosure may be made from a material which is relatively thin, strong and flexible, such as cottons and polyesters, preferably those which are scratch and puncture resistant. Preferably, the material is sufficiently flexible to give the enclosure the capacity to assume a generally upwardly tapered shape on the upright sitting cat. Desirably, the enclosure should allow the head of the cat to be placed in an upward throat-extended position, as shown in dashed lines in FIG. 1. The upper opening 16, in this case, is sufficiently large to extend around the body of the cat. The material in the vicinity of the second opening may be gathered in order to restrict its size beyond the restriction provided for by the elastic strap. This manual gathering, as shown at 16a in FIG. 1, may then be simply held by hand or supplemented by an elastic band 16b or a clip (not shown) or other restraint, in order to inhibit the cat's ability either to force itself further through the upper opening or to withdraw its head back into the enclosure. It is also desirable that the enclosure have a breadth and height to fit comfortably and loosely on the upright sitting cat.

Figure 2:
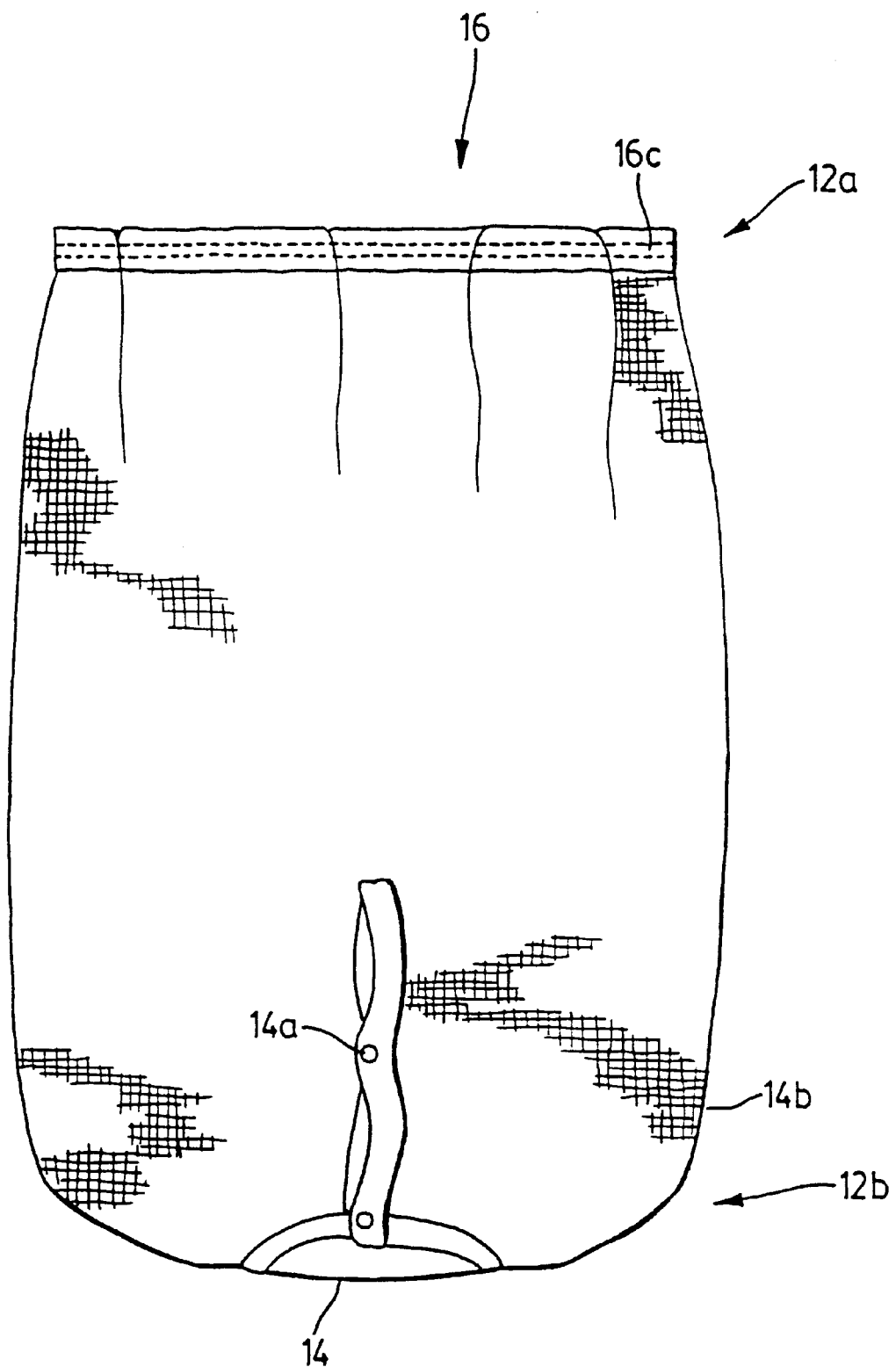
FIG. 2 is a plan view of the device of FIG. 1 in an inoperative condition.

Referring to FIG. 2, the first opening 14 is formed in an inner closed end of the enclosure. The flap 14b is provided on one side of the opening and held in place by snaps 14a, akin to the collar region of a shirt. The second opening is, in this case, as wide as the enclosure itself and is provided with a stitched seam to receive the elastic strap shown in dashed lines at 16c.

The device 10 may be used as follows. First, the second opening 16a is spread wide and the enclosure is then bunched or collapsed at the second opening reveal the portion 12c, as shown by the dashed lines in the lower region of FIG. 1. The cat's hind quarters are then placed on the portion 12c and the cat's tail is fed through the opening 14 and with the appropriate number of snaps 14a closed (or preset). Next, the enclosure is &awn upwardly and around the cat, as shown by the chain-dotted arrows in FIG. 1, until the second opening is adjacent the cat's neck. The material of the enclosure in the vicinity of the second opening is then gathered as shown at 16a in FIG. 1 and, if desired, either twisted and held by hand or held by some form of supplemental restraint such as an elastic band 16b or a clip, thereby to draw the second opening sufficiently snug against the cat's neck to inhibit the cat's ability either to force itself further through the second opening or to withdraw its head back into the enclosure. In other words, the cat is, but for its head and tail, confined to the enclosure while in the upright sitting position.

When properly held in the device 10, the cat should be able to remain in a comfortable upright sitting position. The cat may instinctively recognize that it cannot bolt away because its feet are inside the enclosure. Meanwhile, the cat's tail is outside the enclosure to aid the cat to balancing itself in the upright sitting position. The cat's head may then be placed in an upward throat-extended position to allow the medication to be administered, through the mouth, eyes or ears, for example.

As soon as the treatment is finished, the gathering of material in the vicinity of the second opening 16 may be released and spread wide (and possibly as well the snaps 14a released) for the cat, if desired and if able, to step out of the enclosure.

Thus, the device 10 allows the cat to sit in its natural upright sitting CUPS position and not be restrained from doing so by the enclosure. In other words, the enclosure does not force the cat to be in an uncomfortable unnatural fixed position. However, due to the configuration of the second opening, the cat cannot retract its head, nor can the cat extend its paws out of the enclosure. Desirably, the cat may, in some cases, leave the enclosure simply by stepping through the second opening when the treatment is finished.

Figure 3:
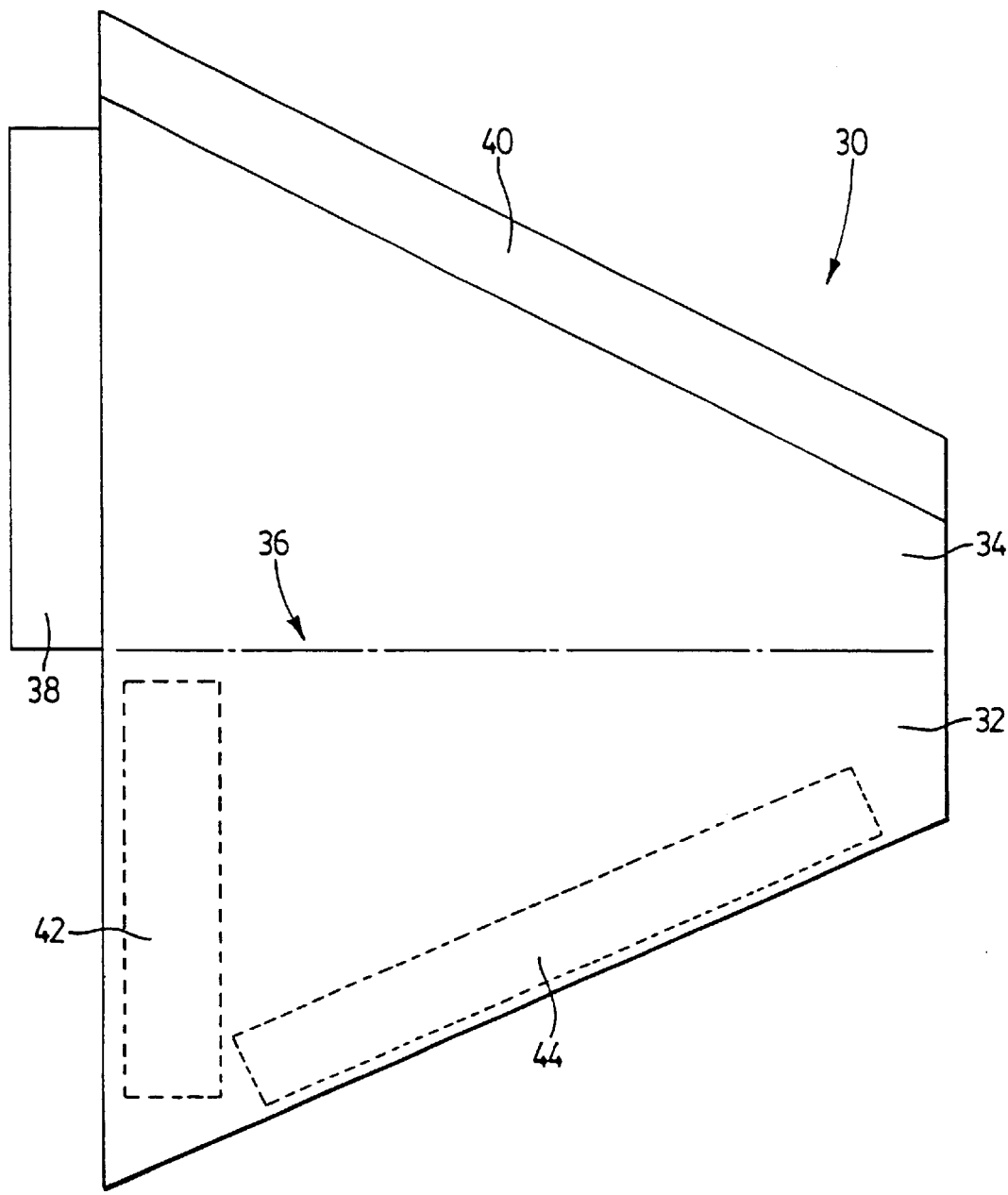
FIG. 3 is a plan view of another cat restraining device.
Figure 4:
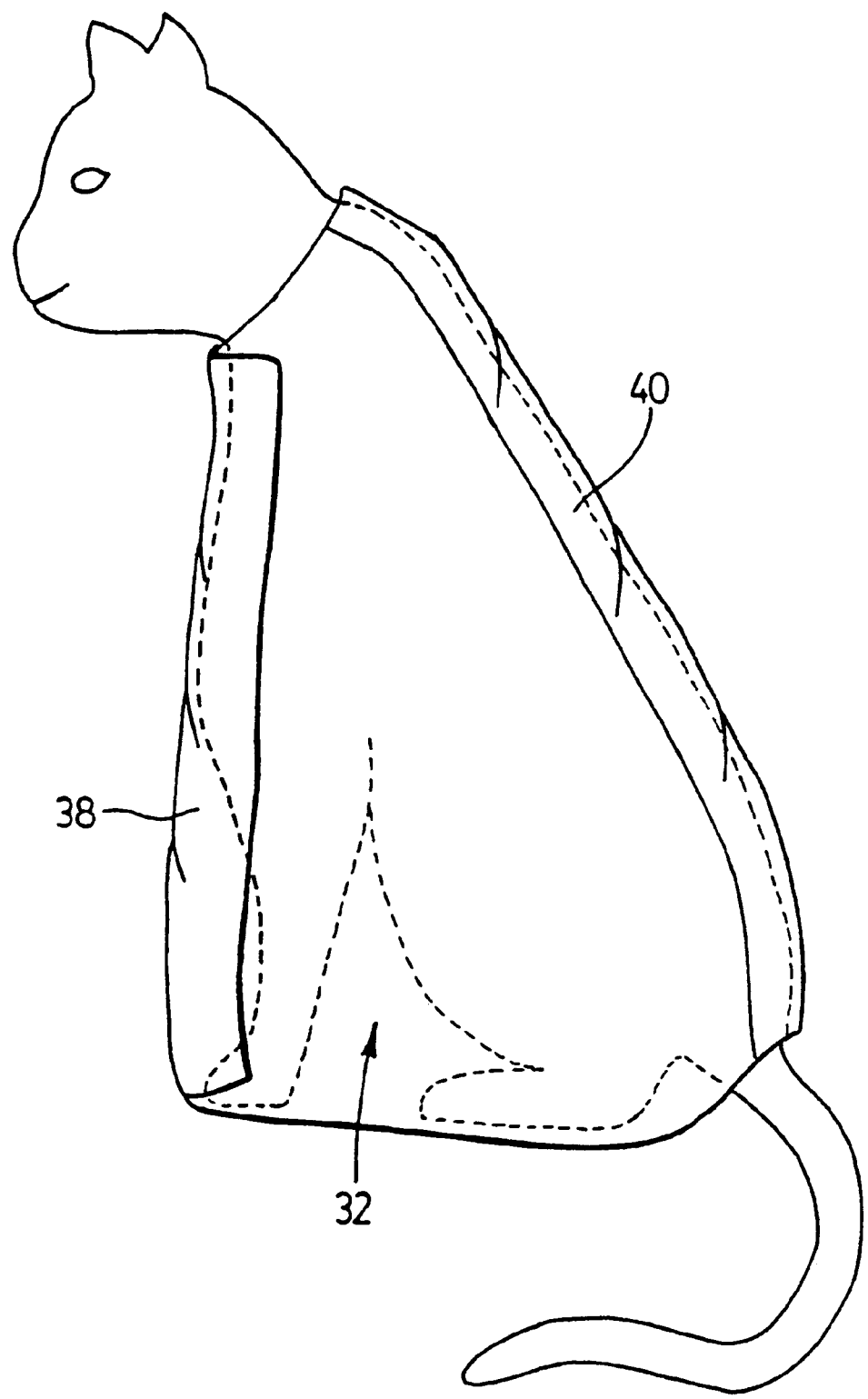
FIG. 4 is a side view of the device of FIG. 3 in an operative condition.
Figure 5:
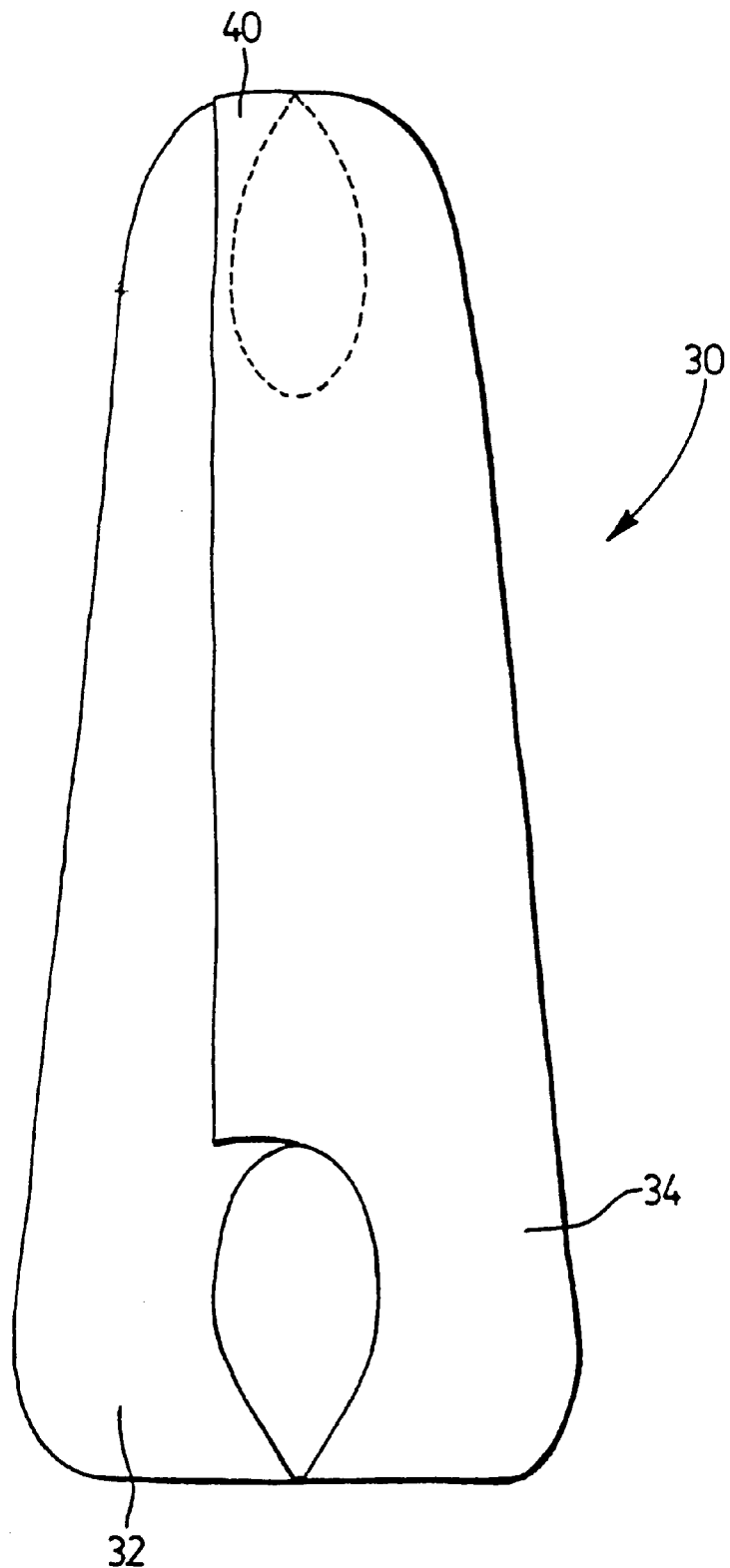
FIG. 5 is an end view of the device of FIG. 3 in an operative condition.

Another device for restraining a cat is shown at 30 in FIG. 3, in this case in the form of a blank having a pair of panels 32 and 34 extending outwardly from a central region 36. The panel 34 has a first fastening flap 38 and a second fastening flap 40. Both have hook and loop fasteners, such as that sold under the trade name VELCRO which are complementary with strips on the opposite face of the panel 32 as shown in dashed lines at 42 and 44. In this case, the panels and flaps are dimensioned to extend around a cat whose hind quarters are placed near the central region 36, allowing the panels 32 and 34 to be wrapped around the cat and the fastening flaps engaged with their corresponding strips to restrain the cat as shown in FIG. 4.

If desired, the device 10 or others made according to the present invention may allow the cat, in addition to assuming the upright sitting position, to adopt other positions such as a lower sitting position, for example, where the cats front paws lie in a generally relaxed non-weight-bearing position.

What is claimed is:

1. A device for restraining a cat, comprising an enclosure capable of receiving the cat in an upright sitting position, the enclosure having:
   a first opening dimensioned to receive the cat's tail;
   a second opening dimensioned to receive the cat's body, said second opening having a fastener for reducing and securing the dimension of said second opening adjacent to the cat's neck; and
   said fastener providing releasable restraint mechanism for inhibiting the cat's ability to force itself through said second opening once received in said enclosure;
   wherein, but for the cat's head and tail, the cat is confined to the enclosure until released.

2. The device as defined in claim 1 wherein said enclosure is bag shaped and has an upper region and a lower region.

3. The device as defined in claim 2, wherein said first opening is in said lower region and said second opening is in said upper region, wherein said second opening is sufficiently large to receive the cat's body there through.

4. The device as claimed in claim 2, wherein said enclosure defines a generally upwardly tapered shape extending from said lower region to said upper region.

5. The device as claimed in claim 4, wherein the tapered shape provides a generally triangular enclosure.

6. The device as claimed in claim 5, wherein said first opening is located at a first apex of the triangular enclosure and said second opening is located at a second apex.

7. The device as claimed in claim 5, further comprising a gathering portion of said enclosure located adjacent to said second opening.

8. The device as claimed in claim 7, wherein the gathering portion facilitates restriction of the dimension of said second opening in addition to the restriction provided by said fastener.

9. The device as claimed in claim 8, wherein the gathering portion provides a handle for manipulating by a user the placement of said enclosure when the cat is confined therein.

10. The device as defined in claim 1 wherein the enclosure is made from a fabric.

11. The device according to claim 10, wherein said fabric inhibits penetration of the cat's claws external to said enclosure when said cat is confined therein.

12. The device as defined in claim 1, further comprising restriction means to restrict, at least partially, the size of the second opening.

13. The device as defined in claim 12 wherein said restriction means is elastic.

14. The device as defined in claim 1 wherein said enclosure includes a first portion to lie beneath the cat's hind quarters and a pair of second portions extending laterally outwardly therefrom.

15. The device as defined in claim 14 further comprising fastening means for removably fastening the second portions together.

16. A method of restraining a cat comprising:
   a) placing the cat in an enclosure having a first passage and a second passage;
   b) locating the first passage near one end of the enclosure and a second passage near another end of the enclosure;
   c) placing the cat's hind quarters through the second passage into the enclosure and- passing the cat's tail through the first passage; and thereafter
   d) drawing the second passage past the cat's body.

17. The method as defined in claim 16, further comprising placing the cat's head in an upward throat-extended position.

18. The method as defined in claim 16 further comprising:

gathering a portion of the enclosure near a peripheral region of the second passage and retaining the gathered portion to confine the cat's neck in the second passage.

19. The method as defined in claim 18 further comprising:

releasing the gathered portion, and spreading the second passage to permit the cat to step there through.

20. The method according to claim 16 further comprising the step of forming the enclosure to define a generally triangular shape.

21. A device for restraining a cat and capable of receiving the cat in an upright sitting position, the device comprising:

an enclosure having a first opening to receive a cat's tail therethrough;

said enclosure having a second opening for receiving a cat's neck therethrough;

a fastener for restricting the dimensions of said second opening adjacent to the neck; and said enclosure defining a generally upwardly tapered shape;

wherein said first opening is located adjacent to a first apex of the shape and said second opening is located adjacent to a second apex.

22. The device as defined in claim 21, wherein the dimension of said second opening in an unrestricted state is sufficiently large to receive a cat's body therethrough.

23. The device as claimed in claim 22 wherein the tapered shape provides a generally triangular enclosure.

\* \* \* \* \*